Figure 6:
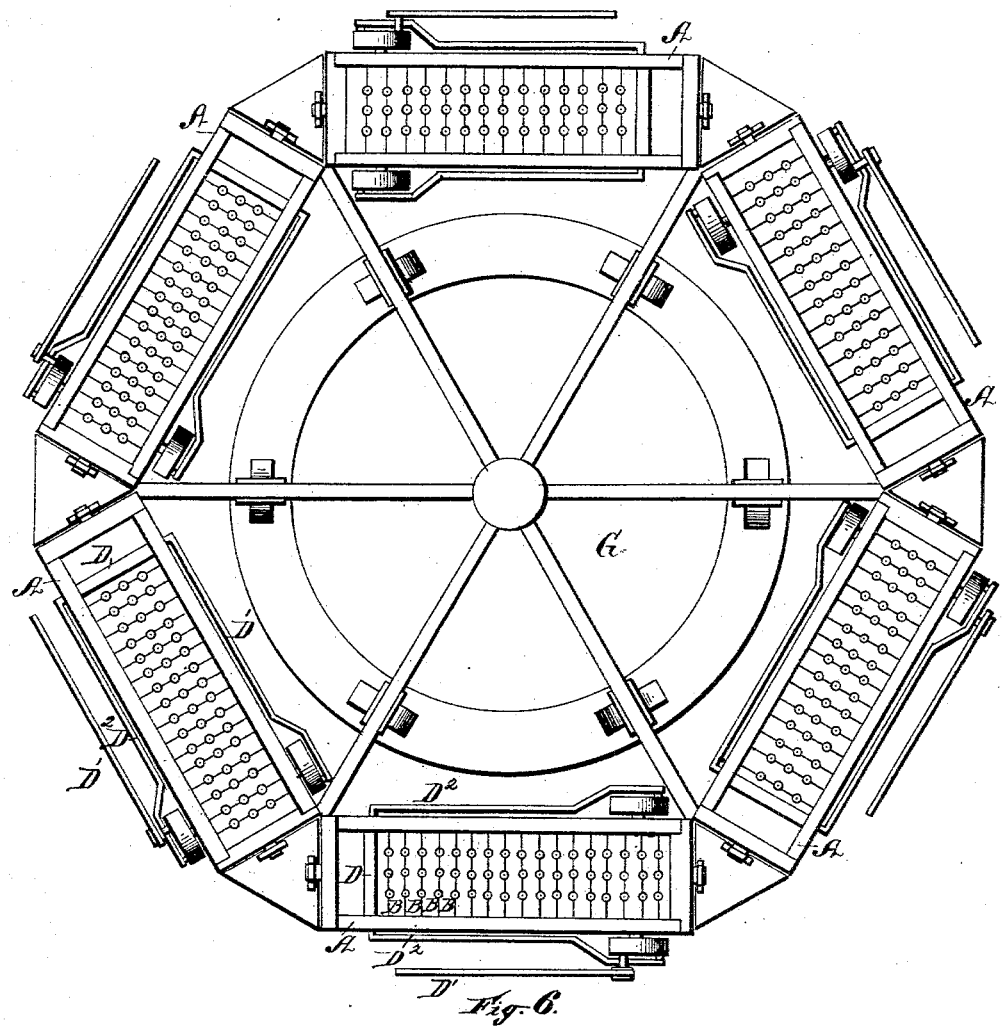

(No Model.) 2 Sheets—Sheet 1.
O. P. COWDERY.
MACHINE FOR THE MANUFACTURE OF SCHOOL CRAYONS.
No. 303,814. Patented Aug. 19, 1884.
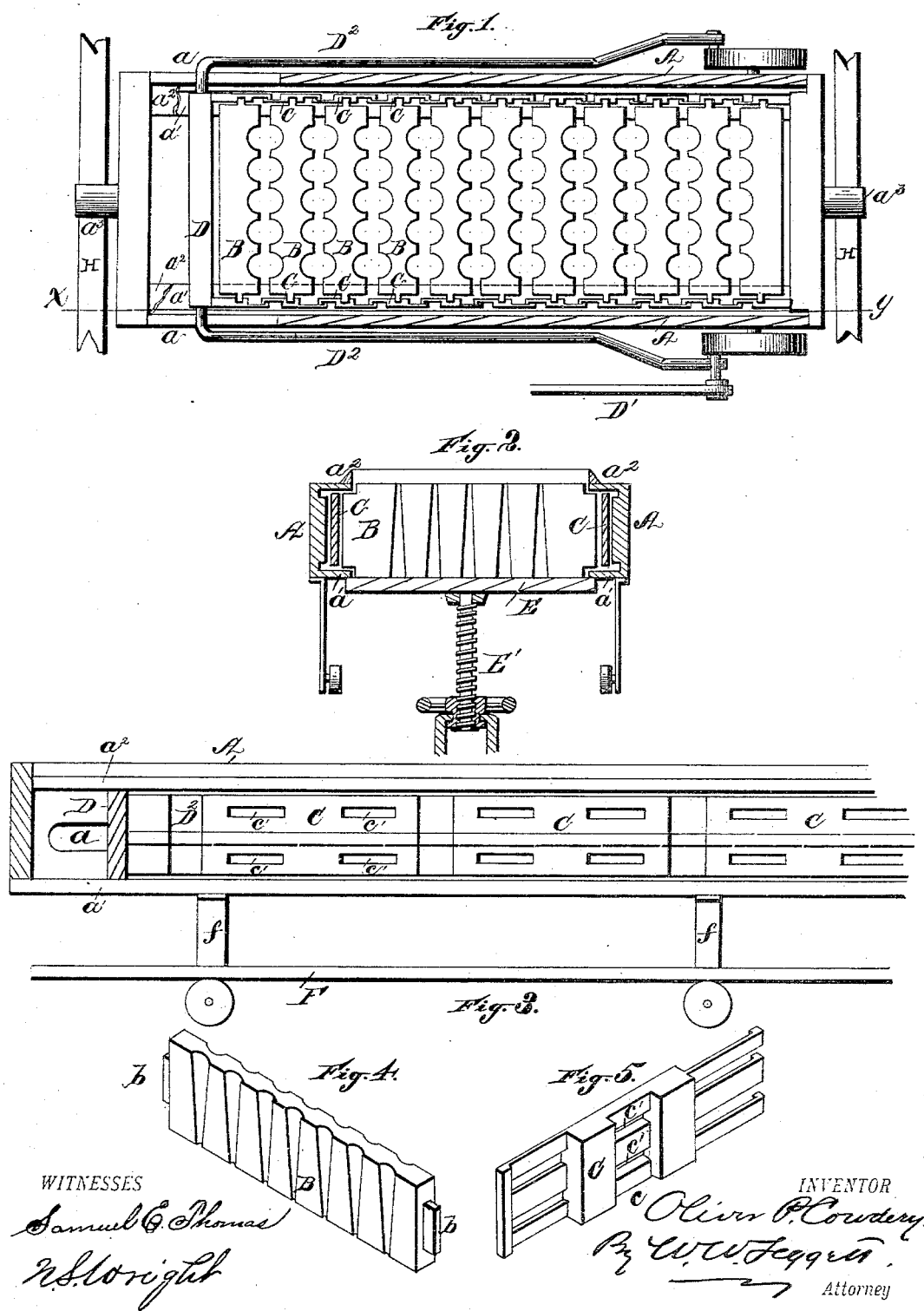

United States Patent Office.

OLIVER P. COWDERY, OF SANDUSKY, OHIO.

MACHINE FOR THE MANUFACTURE OF SCHOOL-CRAYONS.

SPECIFICATION forming part of Letters Patent No. 303,814, dated August 19, 1884.

Application filed June 24, 1884. (No model.)

*To all whom it may concern:*

Be it known that I, OLIVER P. COWDERY, of Sandusky, county of Erie, State of Ohio, have invented a new and useful Improvement in Machines for the Manufacture of School-Crayons; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a plan view of a device embodying my invention. Fig. 2 is a vertical section of the same. Fig. 3 is a longitudinal section along $x\,y$, Fig. 1. Fig. 4 is a separate view of one of the molds. Fig. 5 is a separate view of one of the links. Fig. 6 is a plan view of the turn-table with a series of mold-frames thereon.

The object of my invention is to provide an improved machine for the manufacture of school-crayons and other analogous articles.

It consists, essentially, first, of a mold-frame with a series of molds located therein, and mechanism for reciprocating all or part of the same for the purpose of forcing said molds lightly together for the reception of the material of which the crayons are composed, and for separating the molds for the removal of the crayons without taking the molds from the frame; second, in providing the mold-frame and its reciprocating molds with an adjustable rack in which the crayons may be deposited when disengaged from the molds; third, in providing means whereby a series of said frames may be brought around to the operator one after another; and, fourth, in other general features and arrangements of the device.

I carry out my invention as follows:

As illustrated in the drawings, A represents a mold-frame, of any suitable construction.

B represents a series of molds of any desired form, located therein, preferably consisting of a series of plates having half-molds on each face, as shown in Fig. 4.

C represents a series of adjustable links, located in the frame and engaged with the ends of the molds.

D represents a follower engaged with said links, and provided with a cam-lever, D', connected therewith by one or more bars, D², for reciprocating the follower through a slot, $a$, in the side of the frame, and by means of its connection with the adjustable links reciprocating also all or part of the molds engaged with said links to open and close the same. I would have it understood, however, that I do not limit myself to the employment of the follower and cam mechanism alone for this purpose, as I contemplate any suitable device for reciprocating the molds in the frames—as, for instance, a toggle-joint or screw or any other reciprocating mechanism. I would have it understood, also, that I do not confine myself to the precise form of the links shown in the drawings, as I contemplate, broadly, any form of links or other devices by which the molds may be adjustably connected together.

The frame may be provided with flanges $a'$ and $a^2$ above and below the ends of the molds, to house the adjustable links and to keep the molds in the frame. These flanges may either be integral with the frame or they may be made separate and secured thereto. The latter admits of the ready insertion and removal of the molds and links. The molds may be engaged with the links in any proper manner, either by angular shoulder $b$, as shown, to engage in the sockets $c$ of the links, or the molds may be constructed with annular extensions adapted to engage in one or more of the slots $c'$ of the link, and may be made to turn with the mold-faces down for the release of the crayons, if desired, the molds having a pivotal connection at their ends with the links, if desired, for this purpose.

E is a base-plate, which may be made adjustable in any proper way—as, for instance, by a screen, E'—to close up one end of the orifices of the molds, if said orifices are made through the mold-plates. It is common, however, in molds of various kinds—as, for instance, bullet-molds, glass-molds, &c.—to construct them with a closed base, which would dispense with the necessity of the base-plate.

F represents a rack for the reception of the crayons as they are released from the molds.

This rack may be supported beneath the mold-frame either by supports *f*, connected with said frame or by independent supports, the rack being removable.

G is a turn-table upon which a number of mold-frames are located, constructed in any manner adapted to support a series of mold-frames, and whereby each of said frames may be brought about before the operator one after another in succession.

The operation of the device is as follows: When it is desired to fill the molds with the material of which the crayons are composed, the molds are closed tightly together by operating the lever D'. The edges of the frame are preferably projected, so as to hold the mass as it is poured upon the molds. When the crayons have set sufficiently for removal, the cam-lever is reversed and the molds are opened, so as to allow the crayons to be released and to be deposited in the racks below. A mallet may be employed, if necessary, to rap the molds to assist in disengaging the crayons from the molds.

It is evident that the mold-frames may be provided with bearings $a^3$, by means of which they may be turned over, if desired.

I would have it understood that I contemplate using the mold-frames either with or without mechanism for bringing a series of them in succession before the operator, one after another. By this construction the entire operation is performed without removing the molds from the mold-frames, and in a rapid and economical manner.

The links constructed as shown in Fig. 5, with the sockets *c* and orifices *c'*, may be used either with molds having their ends angular or annular.

In case the turn-tables are not employed the mold-frames A may be mounted upon any suitable supporting-frame, H.

What I claim is—

1. The combination of a series of sectional molds connected together so that the power applied to open and close one mold will open and close the series, substantially as described.

2. The combination, with a frame, of a series of sectional molds located therein, and adapted to be opened and closed without removal from the frame, substantially as described.

3. The combination of a supporting-frame and a series of sectional sliding molds connected together, and adapted to impart motion from one to the other in opening and closing, substantially as described.

4. A mold-frame provided with a series of molds, adjustable links connecting said molds, and a follower engaging with said links for reciprocating the molds, substantially as described.

5. In a machine for the manufacture of crayons, a series of adjustable links adapted to be engaged with the molds, substantially as described.

6. A mold-frame provided with a series of adjustable molds adapted to be opened and closed, and a rack for receiving the crayons from said molds, substantially as described.

7. In a crayon-machine, a series of mold-frames provided each with a series of molds, and connected with a support permitting the frames to be successively brought before the operator, substantially as described.

8. In a crayon-machine, the combination of a series of separable molds and a reversible frame for supporting and inverting the same to discharge the crayons, substantially as described.

9. In a crayon-machine, a series of separable molds confined in a frame, and mechanism for supporting several such frames and adapted to bring them successively before the operator, each said frame adapted to be rotated upon its supports, whereby the frame is inverted, so as to discharge its crayons, substantially as described.

10. The combination, with a frame provided with a series of reciprocating molds, of a base-plate for closing the base-aperture of the cavities in said molds, substantially as described.

11. A series of mold-frames, each provided with a series of molds, and mechanism for reciprocating the molds without removing them from the frame, said series of mold-frames connected to a movable support, whereby they may be moved one after another in succession before the operator, substantially as described.

In testimony whereof I sign this specification in the presence of two witnesses.

OLIVER P. COWDERY.

Witnesses:
L. H. GOODWIN,
N. S. WRIGHT.